US007973700B2

(12) United States Patent
Gohl

(10) Patent No.: US 7,973,700 B2
(45) Date of Patent: Jul. 5, 2011

(54) DUAL TRANSMITTING ANTENNA SYSTEM

(75) Inventor: Jonathan R. Gohl, Waterford, MI (US)

(73) Assignee: DENSO International America, Inc., Southfield, MI (US)

( * ) Notice: Subject to any disclaimer, the term of this patent is extended or adjusted under 35 U.S.C. 154(b) by 464 days.

(21) Appl. No.: 12/023,755

(22) Filed: Jan. 31, 2008

(65) Prior Publication Data

US 2009/0195465 A1 Aug. 6, 2009

(51) Int. Cl.
*G01S 13/93* (2006.01)
*G01S 7/35* (2006.01)
*G01S 13/00* (2006.01)

(52) U.S. Cl. .............. 342/70; 342/27; 342/59; 342/118; 342/128; 342/175; 342/195

(58) Field of Classification Search .................... 342/27, 342/28, 59, 70–81, 118, 128–133, 146–158, 342/175, 192–197; 701/300, 301; 180/167–169
See application file for complete search history.

(56) References Cited

U.S. PATENT DOCUMENTS 4,818,999 A * 4/1989 Kobayashi et al. ............. 342/59
5,486,832 A * 1/1996 Hulderman ...................... 342/70
5,495,255 A * 2/1996 Komatsu et al. .............. 342/175
5,579,010 A * 11/1996 Iihoshi et al. ................... 342/70
5,583,511 A * 12/1996 Hulderman ................... 342/175
5,598,163 A * 1/1997 Cornic et al. ................... 342/70
5,614,909 A * 3/1997 Komatsu et al. ................ 342/70
5,717,399 A * 2/1998 Urabe et al. .................... 342/70
5,724,042 A * 3/1998 Komatsu et al. .............. 342/175
5,933,109 A * 8/1999 Tohya et al. .................. 342/175
5,945,939 A * 8/1999 Iihoshi ............................ 342/70
5,999,092 A * 12/1999 Smith et al. ...................... 342/71
6,008,751 A * 12/1999 Kudoh ............................ 342/70
6,028,548 A * 2/2000 Farmer ............................ 342/70
6,075,479 A * 6/2000 Kudoh ............................ 342/70
6,130,640 A * 10/2000 Uematsu et al. .............. 342/175
6,137,434 A * 10/2000 Tohya et al. .................... 342/70
6,501,415 B1 * 12/2002 Viana et al. ...................... 342/27
6,727,844 B1 * 4/2004 Zimmermann et al. ......... 342/70
6,750,810 B2 * 6/2004 Shinoda et al. ............... 342/149
6,762,711 B1 * 7/2004 Doerfler .......................... 342/70
6,853,329 B2 * 2/2005 Shinoda et al. ............... 342/149
6,873,251 B2 * 3/2005 Schiffmann et al. ............ 342/59
6,992,613 B2 * 1/2006 Yoneda ........................... 342/59
7,095,361 B2 * 8/2006 Mattes et al. ................... 342/70
7,151,482 B2 * 12/2006 Natsume et al. .............. 342/147
7,173,561 B2 * 2/2007 Isaji ................................ 342/70
7,248,153 B2 * 7/2007 Danz et al. ...................... 342/70
7,414,569 B2 * 8/2008 De Mersseman ............... 342/59
7,486,223 B2 * 2/2009 Shima ............................. 342/70
7,518,545 B2 * 4/2009 Minichshofer ................. 342/70
7,592,945 B2 * 9/2009 Colburn et al. ................. 342/70
2004/0246168 A1 * 12/2004 Isaji ................................ 342/70

* cited by examiner

*Primary Examiner* — Bernarr E Gregory
(74) *Attorney, Agent, or Firm* — Harness, Dickey & Pierce, PLC

(57) ABSTRACT

A vehicle system includes a signal processing module and a first antenna that provides a first transmitted signal that has a first phase. A second antenna of the system provides a second transmitted signal that has a second phase that differs from the first phase. At least one receive antenna of the vehicle system receives first and second received signals that correspond to the first and second transmitted signals, respectively. The signal processing module processes the received first and second signals based on the first and second transmitted signals and selectively controls transmissions of the first and second transmitted signals.

20 Claims, 3 Drawing Sheets

DUAL TRANSMITTING ANTENNA SYSTEM

FIELD

The present disclosure relates to object detection systems and more particularly to object detection systems for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

One possible area of increased driver assistance involves detection of objects in front of a vehicle. Objects, such as other vehicles, pedestrians, etc. may approach or may be approached by the vehicle. A driver may not always detect the objects and perform appropriate intervention actions to avoid a collision. A sensor system, however, may detect objects in the path of the vehicle, and this detection may be used by other vehicle systems to avoid collisions.

For example, it is common for a vehicle operator to use cruise control to maintain a constant speed on a highway. In the event another vehicle makes a lane change into the path of the vehicle or the vehicle comes upon a slower vehicle, the operator may be required to disable the cruise control, typically by stepping on the brake. A problem occurs when the operator is slow to react to the other vehicle and fails to disable the cruise control in time. Adaptive cruise control systems have been developed to adjust automatically the speed of the vehicle. However, vehicle systems, such as adaptive cruise control systems, may depend on the accuracy and completeness of data received from remote sensor systems.

SUMMARY

A vehicle system includes a signal processing module and a first antenna that provides a first transmitted signal that has a first phase. A second antenna of the system provides a second transmitted signal that has a second phase that differs from the first phase. At least one receive antenna of the vehicle system receives first and second received signals that correspond to the first and second transmitted signals, respectively. The signal processing module processes the received first and second signals based on the first and second transmitted signals and selectively controls transmissions of the first and second transmitted signals.

In other features a plurality of receive antennas receive the first and second received signals. A plurality of switches selectively control the plurality of receive antennas. A plurality of comparators communicate with the selectively controlled receive antennas. A mixer generates a beat signal based on one of the received first and second signals and one of the transmitted first and second signals. First and second voltage controlled oscillators selectively provide the first and second transmitted signals, respectively, based on signals from the signal processing module.

In other features, the signal processing module samples the beat signal. The plurality of receive antennas are contiguously collocated. The first and second antennas are contiguously collocated with the plurality of receive antennas. The first phase and second phase differ by predetermined amount. The first and second signals include at least one of radar, lidar, and vision signals.

In other features, the first antenna is positioned at a first angle, and the second antenna is positioned at a second angle that differs from the first angle. A control module controls a vehicle safety system based on both the first and second received signals but does not control the vehicle system based on only one of the first and second received signals. The first angle directs the first antenna above a centerline of the vehicle; and the second angle directs the second antenna below the centerline.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
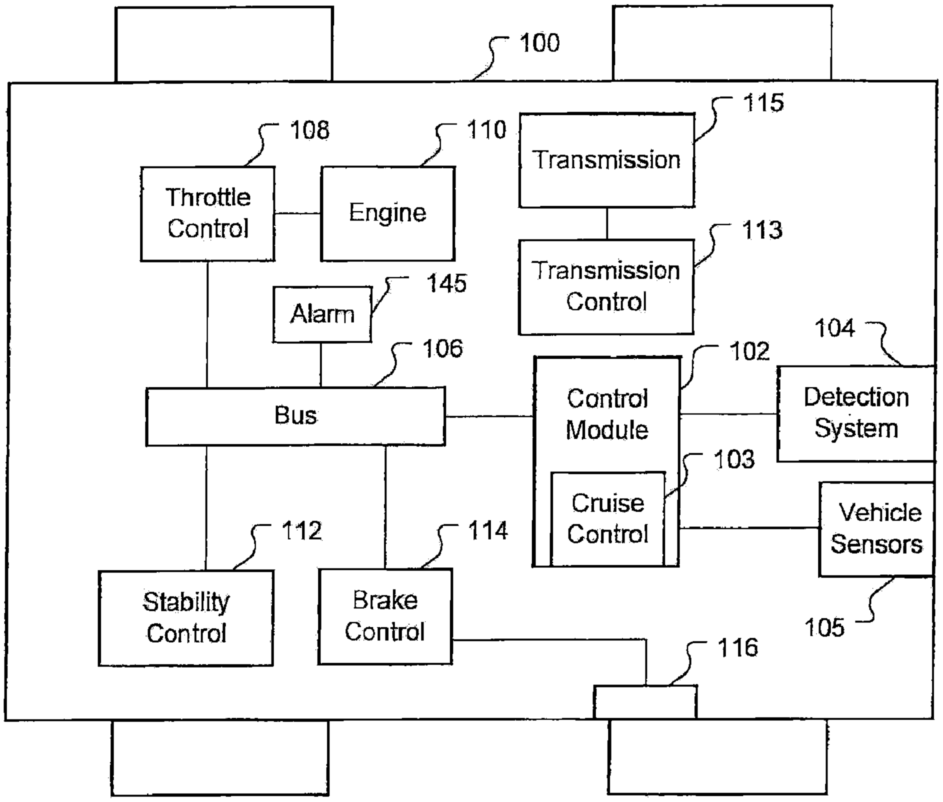
FIG. 1A is a functional block diagram of a vehicle in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1A, a vehicle 100 includes a vehicle control module 102 that communicates with an object detection system 104. The object detection system may transmit and receive remote signals, such as radar, lidar and vision based signals. The vehicle control module 102 may include an adaptive cruise control module 103. The vehicle control module also communicates with various vehicle sensors 105.

Figure 1B:
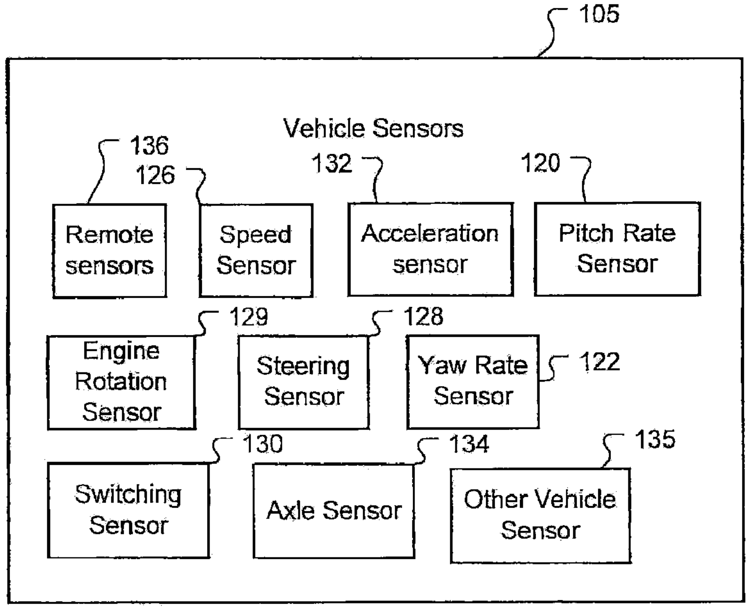
FIG. 1B is a functional block diagram of vehicle sensors in accordance with the present disclosure.

Referring now to FIG. 1B, the sensors 105 may include pitch rate sensors 120, yaw rate sensors 122, speed sensors 126, steering wheel sensors 128, engine rotation sensors 129, switching sensors 130, acceleration sensors 132, axle sensors 134, other vehicle sensors 135, etc. The vehicle sensors 105 may also include remote sensors 136, such as vision-based sensors, lidar sensors, radar sensors, etc that may remotely detect objects. The remote sensors 136 may therefore be used to supplement the detection system 104.

The control module 102 communicates through a bus 106, which may be wired or wireless, with various vehicle systems. The vehicle systems may include, among others, a throttle control module 108 that at least partially controls an engine 110, a stability control module 112 that selectively controls engine and/or braking systems, a transmission control module 113 that controls a transmission 115, and a brake control module 114 that controls vehicle brakes 116.

Figure 2:
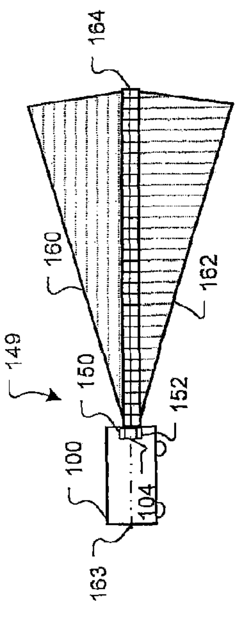
FIG. 2 is a functional block diagram of a vehicle in accordance with the present disclosure.

Referring now to FIG. 2, the vehicle 100 includes a dual antenna system 149 that includes two transmission antennas 150, 152 that transmit phase shifted signals 160,162 and a plurality of reception antennas that receive the signals. For example, the signals 160, 162 may be output in an alternating pattern 50-milliseconds apart given a 100-millisecond cycle. Antennas may be contiguously collocated or spaced apart horizontally and/or vertically. The antennas may also be positioned at different locations on the vehicle 100.

The transmission antennas 150, 152 may direct the signals 160, 162 at different angles. For example, a first signal 160 may be directed at approximately 8 to 10 degrees above a centerline 163 of the vehicle 100; and the second signal 162 may be directed approximately 8 to 10 degrees below the centerline 163. The different angles may significantly overlap within a range 164 in front of the vehicle 100 that may be predetermined, such as from a 3 to 100 meter range. The antennas 150, 152 may include, for example, 77 GHz mm-wave radar antennas.

When only one of the signals 160 is received that indicates an object, the control module 102 may determine that the object detected is not another vehicle. For example, the first signal 160 may indicate an object above the centerline, and the second signal 162 may indicate an object below the centerline. If only the first signal 160 is received, the object is either above the vehicle 100 (and thus not a vehicle) or too short to be a vehicle. If only the second signal 162 is received, the object may be too short to be a vehicle. However, if both signals 160, 162 indicate an object, the control module 102 may determine that the object is sufficiently large to be another vehicle in front of the vehicle 100.

Basically, the dual antenna system 149 differentiates between positives and false positive situations by providing upper bounds (with the first signal 160), lower bounds (with the second signal 162) and overlap 164 of transmitted signal coverage. A positive situation indicates that a vehicle system may be required to respond to a detected object.

Figure 3:
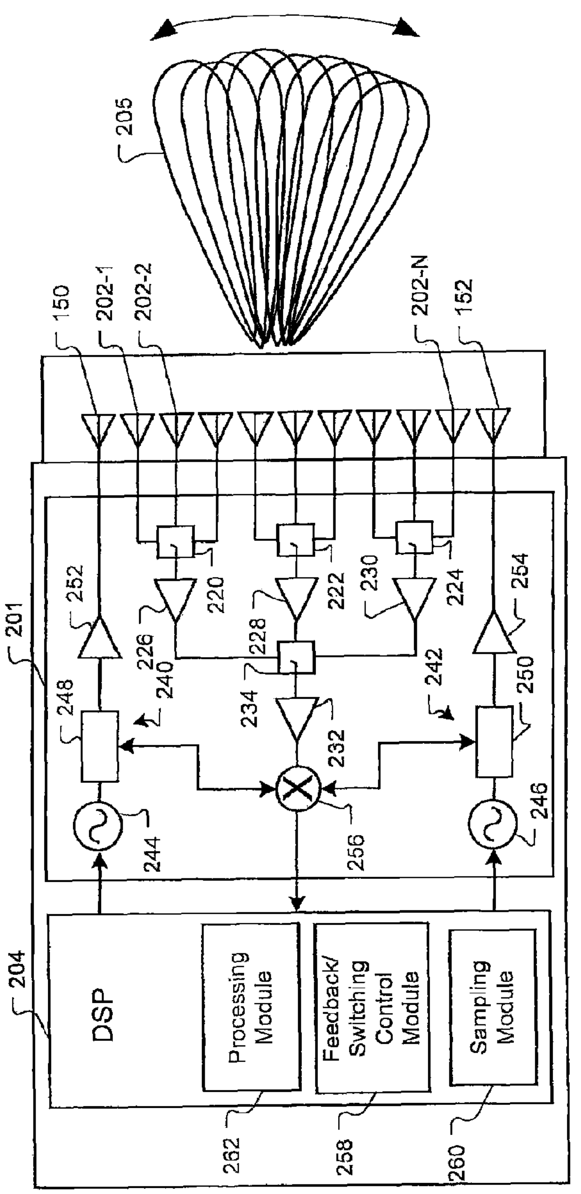
FIG. 3 is a functional block diagram of a detection system in accordance with the present disclosure.

Referring now to FIG. 3, an exemplary object detection system 104 is illustrated. The object detection system 104 includes a control module 201 that selectively controls the transmission antennas 150, 152 and a plurality of receive antennas 202-1, 202-1, . . . , and 202-N (collectively referred to as receive antennas 202). A digital signal processor (DSP) 204 receives and processes signals from the control module 201.

The transmission antennas 150, 152 and/or receive antennas 202 may be moveable or solid state. In other words, the control module 201 may control movement of the antennas or may alternatively switch between the antennas to simulate movement over a desired range 205. Each receive antenna 202 therefore receives approximately the same signal. The control module 201 may simulate movement through selectively controlling switching modules 220, 222, 224. A first stage of comparators 226, 228, 230 receive the signals via the switching modules 220, 222, 224. The switching modules 220, 222, 224 sequentially select one of the antennas 202 to supply a received signal (from the selected antenna) to a subsequent stage. A second stage comparator 232 receives one of the first stage comparator outputs via another switching module 234 and may amplify the outputs.

The control module 201 is illustrated including two or more feedback paths 240, 242. The paths 240, 242 include transmission portions that include voltage controlled oscillators (VCOs) 244, 246, signal conditioners 248, 250, comparators 252, 254 and transmission antennas 150, 152. Both paths 240, 242 receive signals from the second stage comparator 232 through a mixer 256. The mixer 256 communicates with the DSP 204 that in turn provides processed signals to the VCOs 244, 246.

The mixer 256 mixes received signals amplified by the comparator 232 to produce a beat signal. The VCOs 244, 246 generate a radio-frequency signal in a millimetric-wave band modulated to have a rising section where its frequency increases linearly with time and a falling section where its frequency decreases linearly with time. When the VCOs 244, 246 are activated in accordance with an instruction from the DSP 204, radio-frequency signals produced by the VCOs 244, 246 may be amplified by the comparators 252, 254 and directed by the signal conditioners 248, 250 to produce phase offset transmission signals that the antennas 150, 152 transmit as radar waves. A feedback control module 258 of the DSP 204 may control switching operations for the control module 201.

The feedback control module 258 may periodically switch between the transmit portions of the feedback paths 240, 242. For example, the feedback control module 258 may switch on the transmission antenna 150 for a predetermined time, such as 50 milliseconds, and then switch it off for a predetermined time, such as 50 milliseconds. When the transmission antenna 150 is not transmitting, the feedback control module 258 may switch on the transmission antenna 152 for 50 milliseconds and then switch it off for 50 milliseconds.

The DSP 204 may include a sample module 260 that stamps or samples data associated with signals that are transmitted. The stamp may correspond to the time the signals were sent and/or received. When the receive antennas 202 receive the signals, the sampling module 260 may again stamp the signals and a processing module 262 of the DSP 204 may perform processing on the received signals. The processing module 262 may include, for example, a filter for removing unnecessary signal components from the beat signal produced by the mixer 256, an analog-to-digital (A/D) converter for sampling an output of the filter and for digitizing the received signal, a signal processing unit for controlling the activation/stop of the VCOs 244, 246. The processing module 262 may communicate with the control module 102.

The signal conditioners 248, 250 may condition signals for the corresponding feedback paths 240, 242. The signal conditioners 248, 250 may include amplification, filtering, converting, and other processing modules to make sensor output suitable for conversion to a digital format.

Figure 4A:
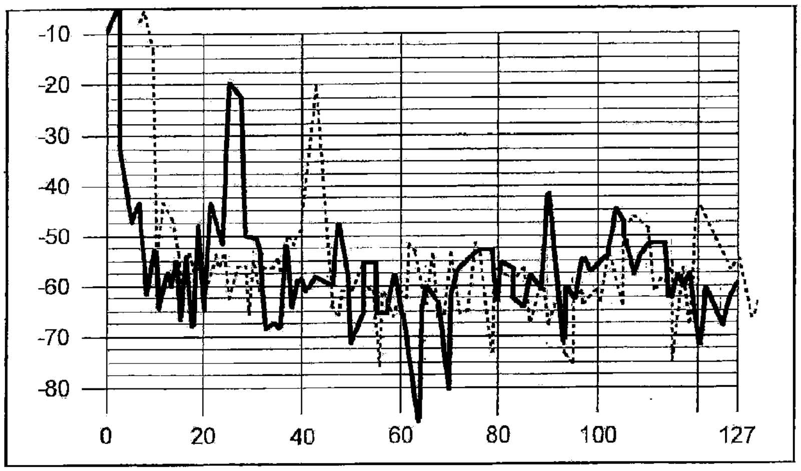
FIGS. 4A-4C are graphical representation of received signal responses in accordance with the present disclosure.
Figure 4B:
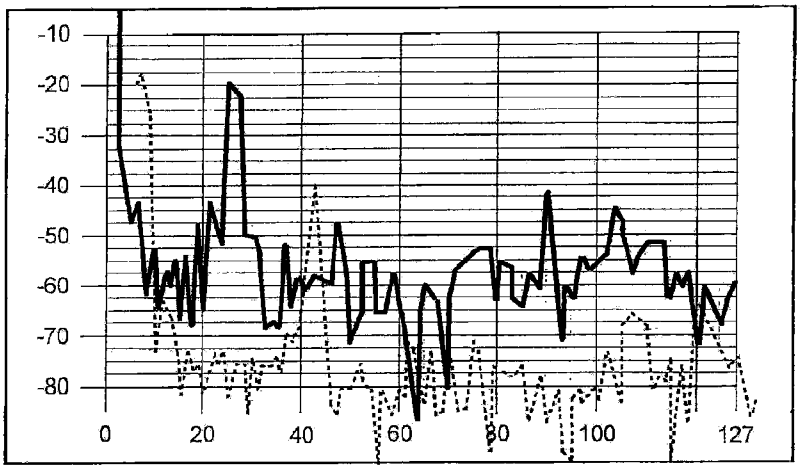
Figure 4C:
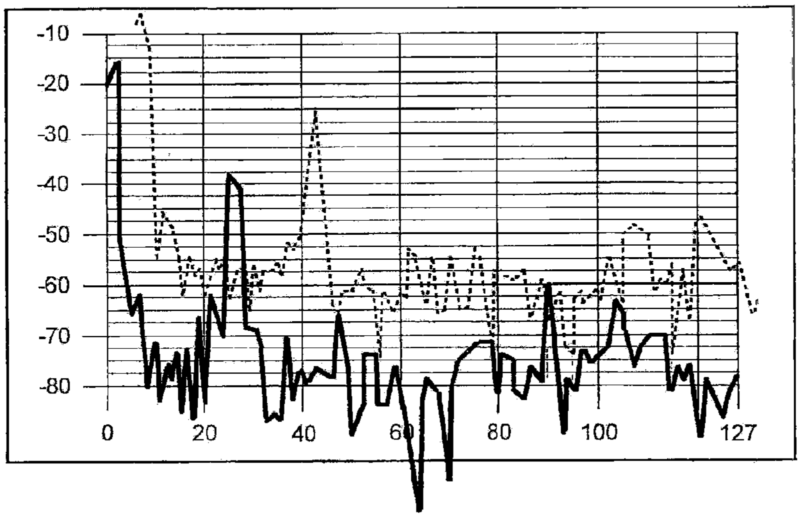

Referring now to FIGS. 4A-4C graphical representations of signal responses are illustrated from the perspective of the mixer 256. Solid lines are used to indicate signals from the transmission antenna 150, and broken lines are used to indicate signals from the transmission antenna 152. The control module 201 may transmit and receive signals for the feedback path 240 and then transmit and receive signals for the feedback path 242.

FIG. 4A illustrates received signals from a large object in front of the vehicle. FIG. 4B illustrates received signals from a high object in front of the vehicle. FIG. 4C illustrates received signals from a low object in front of the vehicle. While the large object may indicate to vehicle control systems that responsive action should be taken, high and low objects may not. In other words, the control module 102 may determine that the high and low objects are above or below the vehicle and therefore not problematic.

In operation, the detection system 104 selectively emits radar. The detection system 104 includes, for example, a wave transceiver that transmits a wave of a predetermined frequency ahead of the vehicle 100, and that receives a reflected wave reflected from another vehicle that is traveling in front of the vehicle 100 and irradiated by the wave. Then, based on a phase difference between the transmitted wave and the received reflected wave (and an attenuation level), the control module 102 determines a relative distance and relative direction or bearing to the other vehicle.

Other vehicle sensors and systems may be used concurrently with the detection system 104 to enhance accuracy and/or to respond to detected objects. For example, the speed sensor 126 may detect rotation of a wheel, and the control module 102 may calculate the travel speed of the vehicle 100 from the number of revolution of the wheel. A travel speed of the vehicle 100 may be also calculated based on an output of an acceleration sensor 132 that detects acceleration of the vehicle 100 or an axle sensor 134 that detects rotation of the axle of the vehicle 100.

Further, the throttle control module 108 may partially control the engine 110 by adjusting the opening of a throttle valve (not shown). The transmission control module 113 controls shifting of the transmission 115 based on a position signal from an accelerator pedal, an engine speed from an engine rotation sensor 129, and the travel speed of the vehicle 100.

The steering sensor 128 that may be equipped with, for example, a plurality of mechanical gears, and may measure the steering angle of a steering wheel of the vehicle 100 based on the number of revolution of the gears.

The yaw rate sensor 122 may be equipped with, for example, a gyro sensor and detects the yaw angular velocity (rotation angular velocity) of the vehicle 100 based on an output of the gyro sensor. The brake control module 114 may include a brake pedal switch that consists of, for example, a switching sensor 130 for detecting a contact, detects whether a brake pedal of the vehicle is depressed, and outputs a brake status signal.

The control module 102 may generate a signal that indicates that an object is in the way of the vehicle 100. Any or all of the vehicle systems may respond to this signal. For example, the stability control module 112 and the brake control module 114 may adjust stability and/or braking operations of the vehicle 100 to avoid a collision and/or vehicle instability for collision avoidance. The systems may also activate an alarm 145 that warns the driver of the object. The alarm 145 may provide an audible and/or visible warning when an object is within a predetermined distance and/or on a collision path with the vehicle 100.

The control module 102 may control systems of the vehicle by determining a travel speed of the vehicle and a target object based on drive control and/or movement of the vehicle 100. Next, the control module 102 may transmit the determined information to the cruise control module 103, the stability control module 112 and the brake control module 114.

Furthermore, the cruise control module 103 may store the received travel speed of the vehicle 100 in internal memory and may determine the travel speed of the other vehicle based on remote sensor signals. The cruise control module 103 may generate control signals for adjusting opening of a throttle valve and for shifting the transmission 115 so that the travel speed of the vehicle 100 is adjusted.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A vehicle system, comprising:
- a signal processing module;
- a first transmitting device that provides a first transmitted signal that has a first phase;
- a second transmitting device that provides a second transmitted signal that has a second phase that differs from said first phase; and
- at least one receive antenna that receives first and second received signals that correspond to said first and second transmitted signals, respectively, wherein said signal processing module processes said received first and second signals based on said first and second transmitted signals and selectively controls transmissions of said first and second transmitted signals.

2. The system of claim 1 further comprising a plurality of receive antennas that receive said first and second received signals.

3. The system of claim 2 further comprising a plurality of switches that selectively control said plurality of receive antennas.

4. The system of claim 3 further comprising a plurality of comparators that communicate with said selectively controlled receive antennas.

5. The system of claim 4 further comprising a mixer that generates a beat signal based on one of said received first and second signals and one of said transmitted first and second signals.

6. The system of claim 5 further comprising first and second voltage controlled oscillators that selectively provide said first and second transmitted signals, respectively, based on signals from said signal processing module.

7. The system of claim 5 wherein said signal processing module samples said beat signal.

8. The system of claim 2 wherein said plurality of receive antennas are contiguously collocated.

9. The system of claim 2 wherein said first and second transmitting devices are contiguously collocated with said plurality of receive antennas.

10. The system of claim 1 wherein said first phase and second phase differ by predetermined amount.

11. The system of claim 1 wherein said first and second transmitted signals include at least one of radar signals and lidar signals.

12. The system of claim 1 wherein said first transmitting device is positioned at a first angle and said second transmitting device is positioned at a second angle that differs from said first angle.

13. A vehicle that comprises:
- the vehicle system of claim 12;
- a control module that determines direction and bearing of a detected object based on at least one of (i) the first and second transmitted signals and (ii) the first and second received signals,
- wherein the control module generates a control signal based on said direction and bearing; and at least one of a stability control system, a brake control system and a cruise control system that operate based on said control signal to prevent a collision with said detected object.

14. The vehicle system of claim 12 further comprising a control module that controls a safety system of a vehicle based on both said first and second received signals but that does not control said vehicle system based on only one of said first and second received signals.

15. The vehicle of claim 12 wherein said first angle is used to direct said first transmitting device above a centerline of a vehicle and said second angle is used to direct said second transmitting device below said centerline.

16. A system for a vehicle, comprising:

signal processing means for processing signals;

first antenna means for providing a first transmitted signal that has a first phase;

second antenna means for providing a second transmitted signal that has a second phase that differs from said first phase by a predetermined amount, wherein said first and second antenna means are contiguously collocated, wherein said first antenna means is directed above a centerline of the vehicle, and wherein said second antenna means is directed below said centerline of the vehicle; and at least one receive antenna means for receiving said first and second received signals that correspond to said first and second transmitted signals, respectively, wherein said signal processing means processes said received first and second signals based on said first and second transmitted signals and selectively controls transmissions of said first and second transmitted signals.

17. The system of claim 16 further comprising:

a plurality of receive antennas means for receiving said first and second received signals that are contiguously collocated with said first and second antenna means; and a plurality of switching means for selectively controlling said plurality of receive antennas.

18. The system of claim 17 further comprising mixer means for generating a beat signal based on one of said received first and second signals and one of said transmitted first and second signals.

19. The system of claim 18 further comprising first and second voltage controlled oscillator means for selectively providing said first and second transmitted signals, respectively, based on signals from said signal processing means.

20. A method for operating a system for a vehicle, comprising:

providing a first transmitted signal that has a first phase from a first antenna that is directed at least partially above a centerline of the vehicle;

providing a second transmitted signal that has a second phase that differs from said first phase from a second antenna that is directed below said centerline;

receiving said first and second received signals that correspond to said first and second transmitted signals, respectively;

processing said received first and second signals based on said first and second transmitted signals; and selectively controlling transmissions of said first and second transmitted signals.

* * * * *